United States Patent [19]

Go

[11] Patent Number: 5,064,606

[45] Date of Patent: Nov. 12, 1991

[54] CHANNEL BOX REMOVING APPARATUS

[75] Inventor: Seitaro Go, Tsuruga, Japan

[73] Assignee: Gotech, Limited, Fukui, Japan

[21] Appl. No.: 497,015

[22] Filed: Mar. 21, 1990

[51] Int. Cl.$^5$ .............................................. G21C 19/00
[52] U.S. Cl. ........................................ 376/261; 376/262
[58] Field of Search ............... 376/260, 261, 262, 268, 376/271, 446, 448; 294/906

[56] References Cited

U.S. PATENT DOCUMENTS

| | | | |
|---|---|---|---|
| 3,856,621 | 11/1974 | Suvanto et al. | 376/271 |
| 4,489,037 | 12/1984 | Go | 376/261 |
| 4,540,545 | 9/1985 | Kondo | 376/434 |
| 4,572,817 | 2/1986 | Silverblatt | 376/261 |
| 4,690,219 | 9/1986 | Go | 294/906 |

*Primary Examiner*—Daniel D. Wasil
*Attorney, Agent, or Firm*—Jones, Tullar & Coooper

[57] ABSTRACT

A channel box removing apparatus which permits a removal of the channel box from a nuclear fuel assembly while being placed on a fuel rack in a spent fuel storage pool without transferring to a preparation machine. The apparatus includes a pair of pivotally mounted, releasable hooks movable between a latched position where the hooks are in lifting engagement with the undersurfaces of clips provided on a pair of diagonally opposed top corners of the channel box and an unlatched position where the hooks are out of engagement with the associated clips. The apparatus also includes a bail cap mounted thereon for vertical movement and adapted to cooperate with a bail of the fuel assembly to guide the apparatus into an operative position with the fuel assembly during lowering of the apparatus. A locking mechanism is provided for preventing accidental disengagement of the hooks from the associated clips when the channel box is being lifted. A first indicator mechanism is also provided for providing a visual indication that the hooks are in the latched position. The apparatus also includes a second indicator mechanism for providing a visual indication that the hooks are in the latched position and also that the channel box alone can be lifted as it has been separated from the fuel assembly.

13 Claims, 9 Drawing Sheets

FIG. 2-
(PRIOR ART)

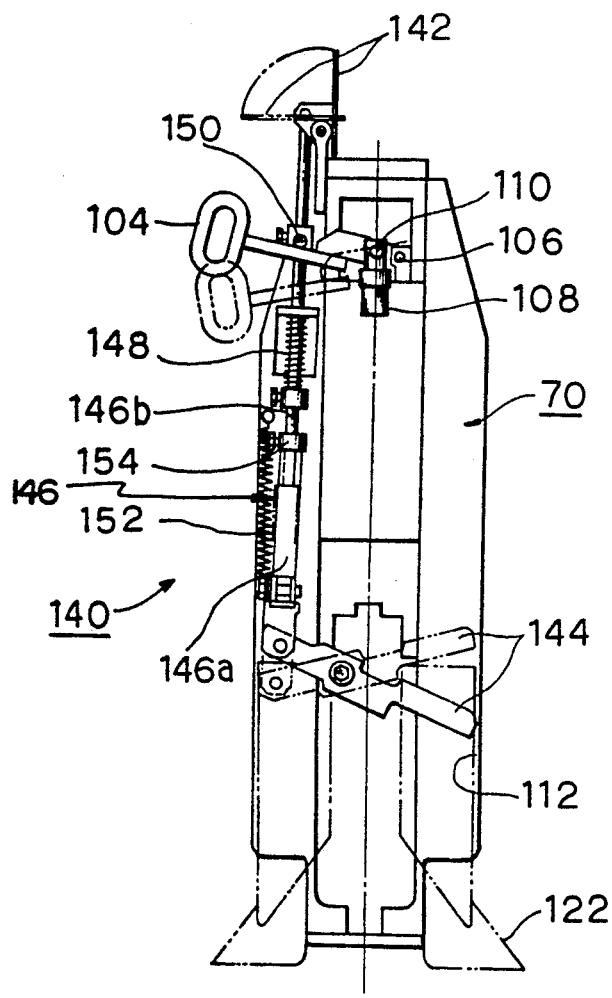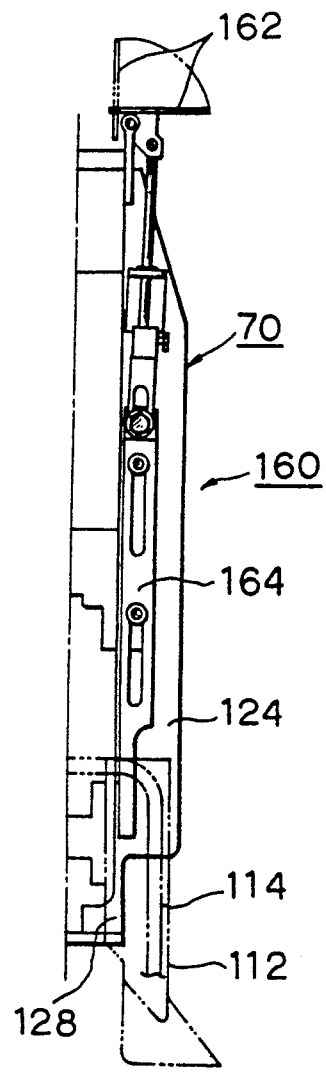
FIG. 9
FIG. 10

CHANNEL BOX REMOVING APPARATUS

BACKGROUND OF THE INVENTION

1. Field of the Invention

This invention relates generally to nuclear fuel handling apparatus and, more particularly, to an improved channel box removing apparatus which is adapted for use in removing the channel box from a nuclear fuel assembly placed on a fuel rack in a spent fuel storage pool in a nuclear power plant. This invention is particularly useful for nuclear fuel assemblies for a boiling water type nuclear reactor.

2. Background

Conventional designs of fuel assemblies for use in a boiling water type nuclear reactor include a multiplicity of fuel rods held in an organized array by spacers spaced along the fuel assembly length. As illustrated in FIG. 1 of the accompanying drawings, such a fuel assembly 10 includes a tubular channel box 12 which is generally square in cross section having a fuel assembly proper 14 mounted therein in a telescopic relationship to each other. The channel box 12 serves to promote contact of the fuel rods with primary coolant flow, facilitate guidance of the fuel rods in the reactor and protect the fuel assembly during transfer to and from the spent fuel storage pool 41 (FIG. 3). The channel box 12 is fastened to the fuel assembly proper 14 by means of fastener bolts 16.

A plurality, e.g., about 760 fuel assemblies are used in a light water reactor of a million KW class, and usually about ¼ of the 760 assemblies, i.e., about 200 assemblies are replaced once a year during a refuelling operation.

During refuelling and other operations such as periodically performed inspections, the channel boxes 12 are removed from the associated fuel assemblies 10. FIG. 2 shows a conventional tool used to remove such channel boxes 12, which comprises a suspension ring-like member 22 adapted for suspension from a crane (not shown), an operating rod 24, and a channel box grappling section 26 mounted to the lower end of the operating rod 24. The channel box grappling section 26 includes a pair of rigid guide members 28 extending downwardly at opposite sides thereof to slidably receive therein the outer surfaces of a pair of diagonally opposed corners of the channel box 12, a pair of releasable hooks 30 pivotally mounted at their upper ends on the grappling section and adapted to engage the undersurfaces of associated clips (not shown) provided on the top of the channel box 12, and a control mechanism 32 for controlling the movement of the releasable hooks 30 in response to a manually operated knob 34 provided on the top end of the operating rod 24. Removal of the channel box from the fuel assembly using such a removing apparatus is conventionally carried out during a refuelling operation within a spent fuel storage pool. Such removal of the channel box will be described hereinafter with reference to FIG. 3 which is a perspective view of the spent fuel storage pool.

(1) About 200 spent fuel assemblies previously transferred to a fuel rack 40 within the spent fuel storage pool 41 are lifted one by one by a main hoist 42 installed on a refuelling platform car 44 for transfer to a preparation machine 46.

(2) At the preparation machine 46, the fastener bolts threaded through the clips of each channel box to secure it and the fuel assembly proper together are first removed using a bolt wrench (not shown).

(3) Then, the removing apparatus 26 suspended from a jib crane 50 provided near the preparation machine 46 is lowered toward the fuel assembly and actuated to bring the releasable hooks 30 into engagement with the associated clips 86 of the channel box 12 to thereby hold the channel box 12 in a predetermined position. With the channel box 12 thus held, the fuel assembly proper 14 is lowered by the preparation machine 46 until it is fully removed from the channel box 12. The channel box 12 thus removed is transferred by the jib crane 50 to a channel box rack 52.

(4) Following the step (3), the fuel assembly proper 14 is transferred by the main hoist 42 from the preparation machine 46 back to the fuel rack 40 for temporary storage.

(5) When the channel box rack 52 becomes fully occupied by channel boxes transferred thereto, additional channel boxes 12 are transferred by a channel box transferring machine (not shown) attached to the lower end of the jib crane cable 50 to a waiting rack 54. When this waiting rack also becomes fully occupied, further channel boxes 12 are transferred again to the fuel rack 40 by a channel box transferring machine (not shown) which is connected to the lower end of a cable of an auxiliary hoist 56. Only flawless channel boxes placed on the fuel rack 40 are later reused.

Generally, the conventional channel box removing apparatus such as one generally designated at 26 has the limitation that it can be used only with such a preparation machine 46 which is capable of removing fuel assemblies, one at a time. Specifically, numerous fuel assemblies 10 are compactly placed on the fuel rack 40, leaving almost no space between the assemblies, as shown in FIG. 4. And, a framework 60 of the fuel rack 40 has a height slightly less than the upper end of each channel box 12. Accordingly, removal of the channel boxes from the fuel assemblies placed on the fuel rack 40 is not possible with the use of the conventional removal apparatus 26, since the guide members 54 cannot be brought into an operative position around the associated corners of the channel box 12 where the releasable hooks 30 can be operated into engagement with the associated clips 62 even if the removal apparatus is of a pneumatic drive type. Thus, it has been common practice to transfer fuel assemblies to the preparation machine 46, one at a time, where the channel box 12 is removed by lifting it from the fuel assembly proper 14. However, this causes inconveniences as set forth below:

(a) Separation of the channel box 12 from the fuel assembly proper 14 at the preparation machine 46 and individual transfer thereof, as described above, require each channel box 12 to be lifted and lowered many times by different hoists or cranes. Specifically, the channel box 12 is transferred by the jib crane 50 having a small radius of transfer to the channel box rack 52 or the waiting rack 54 for temporary storage, while the associated fuel assembly proper 14 is transferred by the main hoist 42 to the fuel rack 40. The channel box 12 is then transferred by the auxiliary hoist 56 to the fuel rack 40. Thus, many transfer steps are involved in an overall channel box removal operation, increasing the possibility of causing damage to channel boxes, prolonging the channel box removal time, and increasing the manpower required and the level of exposure for the operators.

(b) Also, there is a likelihood of the separated fuel assembly proper 14 being damaged during transfer to the fuel rack 40 because of lack of protection provided by the channel box. It has been proposed to use a pneumatic drive to control the releasable hooks of the removing apparatus rather than manually control the knob 34 and also to place a pedestal, called "channel storage adapter" (not shown), in the fuel rack 40 to raise the fuel assembly so as to expose the upper portion of the channel box 12 above the framework 60 so that the removal apparatus 26 can be brought into an operative position with the channel box for transfer from the preparation machine 46. However, the use of such pedestals complicates and prolongs the removal operation and also makes it more difficult to place the guide members 28 of the removal apparatus 26 on the associated corners of the channel box 12 because the fuel rack 40 is located fairly distant from an operating deck.

SUMMARY OF THE INVENTION

It is an object of the invention to provide an improved channel box removing apparatus which overcomes the above-stated disadvantages of the prior art apparatus.

It is another object of the invention to provide an improved channel box removing apparatus which enables an efficient and reliable removal of channel boxes from nuclear fuel assemblies placed on a fuel rack.

The objects stated above and other related objects in this invention are accomplished by the provision of an apparatus for removing a channel box from a nuclear fuel assembly having a bail provided on the top thereof, the channel box being generally square in cross section having the fuel assembly mounted therein in a telescopic relationship to each other, the apparatus having a pair of clips provided adjacent a pair of diagonally opposed top corners thereof, the channel box comprising: a frame structure adapted for suspension from a lifting and transporting device; a pair of releasable hooks pivotally mounted to the lower portion of the frame structure and movable between a first position in which the releasable hooks are in lifting engagement with the clips of the channel box and a second position in which the releasable hooks are released from the lifting engagement with the clips; an operating mechanism for moving the pair of releasable hooks between the first and second positions; and, bail cap means mounted to the lower portion of the frame structure for vertical movement relative to the frame structure, the bail cap means being adapted to cooperate with the bail of the fuel assembly to guide the channel box removing apparatus into an operative position with the fuel assembly during lowering of the apparatus toward the fuel assembly with the pair of releasable hooks in the second position, the operating mechanism being activated to move the pair of releasable hooks into the first position after arrival of the channel box removing apparatus at the operative position.

The bail cap means comprises a pair of spaced support members provided in opposed relationship to each other and having a vertically extending guide slot defined therebetween to slidably receive the bail, a connector means securely connecting the pair of support members in their middle portions and adapted for abutting engagement with the top of the bail, and a pair of bail guides extending downwardly and outwardly from the bottom ends of the respective support members and having their open lower edges adapted to abut the upper ends of the channel box adjacent a pair of diagonally opposed corners thereof different from the pair of diagonally opposed corners having the clips provided thereon.

Each of the releasable hooks has an upper end pivotally mounted to the lower portion of the frame structure and a lower end extending downwardly from the bottom of the frame structure, and bracket means pivotally connected to the releasable hooks in a manner to straddle the hook pair, and the operating mechanism comprises a cylinder mounted to the frame structure, a piston rod for the cylinder and having its lower end operatively connected to the bracket means, and conduit means for supplying operating fluid to the cylinder. Activation of the operating mechanism causes vertical movement of the piston rod and accordingly the bracket means to move the releasable hooks between the first and second positions.

A hand lever is provided having one end rotatably mounted to the frame structure and the other end adapted to be hooked for forced disengagement of the pair of releasable hooks from the channel box, the hand lever being pivotally connected adjacent the other end thereof to the top of the piston rod so that pivotal movement of the hand lever in a direction to cause upward movement of the piston rod moves the pair of releasable hooks to the second position.

Further in accordance with the present invention, there is provided an apparatus for removing a channel box from a nuclear fuel assembly having a bail provided on the top thereof, the channel box being generally square in cross section having the fuel assembly mounted therein in a telescopic relationship to each other, the channel box having a pair of clips provided adjacent a pair of diagonally opposed top corners thereof, the apparatus comprising: a frame structure adapted for suspension from a lifting and transporting device; a pair of releasable hooks pivotally mounted to the lower portion of the frame structure and movable between a first position in which the releasable hooks are in lifting engagement with the clips of the channel box and a second position in which the releasable hooks are released from the lifting engagement with the clips; an operating mechanism for moving the pair of releasable hooks between the first and second positions; bail cap means mounted to the lower portion of the frame structure for vertical movement relative to the frame structure, the bail cap means being adapted to cooperate with the bail of the fuel assembly to guide the channel box removing apparatus into an operative position with the fuel assembly during lowering of the apparatus toward the fuel assembly with the pair of releasable hooks in the second position, the operating mechanism being activated to move the pair of releasable hooks into the first position after arrival of the channel box removing apparatus at the operative position; and a locking mechanism for preventing accidental disengagement of the pair of releasable hooks from the associated clips of the channel box when the channel box is being lifted by the removal apparatus.

The locking mechanism comprises a pair of swing plates capable of selectively doubling the range of pivotal movement of the releasable hooks, each swing plate being pivotally mounted adjacent its upper end to the frame structure and having a slit formed therein, a first pin projecting from each releasable hook and being loosely received in the slit of the swing plate to permit a swinging movement of the lower end of the swing plate beyond the pivotal range of the releasable hook, a second pin provided adjacent the lower end of each swing plate, and a stopper member integrally formed on each side surface of the bail cap means, each stopper member having a groove adapted to be engaged by the associated second pin when the associated releasable hook is in the first position, the second pin being in abutting engagement with the stopper member when the associated releasable hook is in the second position with the bail cap means slightly lowered relative to the removal apparatus.

Still further in accordance with the present invention, there is provided an apparatus for removing a channel box from a nuclear fuel assembly having a bail provided on the top thereof, the channel box being generally square in cross section having the fuel assembly mounted therein in a telescopic relationship to each other, the channel box having a pair of clips provided adjacent a pair of diagonally opposed top corners thereof, the apparatus comprising: a frame structure adapted for suspension from a lifting and transporting device; a pair of releasable hooks pivotally mounted to the lower portion of the frame structure and movable between a first postion in which the releasable hooks are in lifting engagement with the clips of the channel box and a second position in which the releasable hooks are released from the lifting engagement with the clips; an operating mechanism for moving the pair of releasable hooks between the first and second positions; bail cap means mounted to the lower portion of the frame structure for vertical movement relative to the frame structure, the bail cap means being adapted to cooperate with the bail of the fuel assembly to guide the channel box removing apparatus into an operative position with the fuel assembly during lowering of the apparatus toward the fuel assembly with the pair of releasable hooks in the second position, the operating mechanism being activated to move the pair of releasable hooks into the first position after arrival of the channel box removing apparatus at the operative position; and a first indicator mechanism for providing a visual indication that the pair of releasable hooks of the removal apparatus are in the first position.

The first indicator mechanism comprises a first indicator plate pivotally mounted to the frame structure for swinging movement between an upright position and a horizontal position, a first actuator link pivotally mounted to the frame structure adapted to be engaged by the bail cap means, and a control rod having upper and lower ends pivotally connected to the rear face of the first indicator plate and to one end of the first actuator link, respectively, the control rod comprising a lower portion and an upper portion adapted to be moved vertically relative to each other, the upper portion of the control rod being biased downwardly to move the first indicator plate to the horizontal position and adapted to move upwardly to move the first indicator plate to the upright position in response to movement of the pair of releasable hooks from the first to the second position, the lower portion of the control rod being biased upwardly and being in engagement with the lower end of the upper portion of the control rod when the first actuator link is out of engagement with the bail cap means. Lowering of the removal apparatus toward the fuel assembly after the bottom of the bail cap means comes into engagement with the top of the chanel box causes the bail cap means to move upwardly relative to the frame structure to bring the bail cap means into engagement with the lower end of the first actuator link to thereby rotate the first actuator link and to move the lower portion of the control rod downwardly, so that when the operating mechanism is activated in this condition, the upper portion of the control rod moves downwardly to move the first indicator plate to the horizontal position.

A second indicator mechanism is provided for providing a visual indication that the pair of releasable hooks are in the first position and also that the channel box alone can be lifted separately from the fuel assembly.

The second indicator mechanism comprises a second indicator plate pivotally mounted to the frame structure for swinging movement between an upright position and a horizontal position, a second control rod having an upper end pivotally connected to the rear face of the second indicator plate and a lower end extending downwardly through the frame structure into the lower portion thereof and adapted to be engaged by the bail of the fuel assembly, the second indicator plate being normally in the horizontal position due to the weight of the second control rod but adapted to be moved to the upright position by the upward movement of the second control rod caused by upward movement of the bail of the fuel assembly in abutting engagement with the lower end of the second control rod. Lifting of the removal apparatus with the pair of releasable hooks in the first position causes lowering of the bail cap means relative to the frame structure, disengaging the bail of the fuel assembly from the lower end of the second control rod to allow the second control rod to move downwardly thereby moving the second indicator plate to the horizontal position.

A guide means is provided which is removably mounted to the bail cap means to facilitate guidance of the removal apparatus into the operative position with the fuel assembly.

The guide means comprises a pair of conical guide rollers rotatable about a common horizontal axis and adapted to slidably and rotatably engage the pair of diagonally opposed corners of the channel box having no clips provided thereon, and support means removably mounted to the lower end of the bail cap means and supporting the pair of conical guide rollers.

BRIEF DESCRIPTION OF THE DRAWINGS

The above, as well as other features and advanteges of the invention, will become apparent through consideration of the following detailed description in connection with the accompanying drawings, in which:

FIG. 9 is a schematic front elevation of the channel box removing apparatus showing the construction and operation of a first indicator mechanism thereof;

FIG. 10 is a view similar to FIG. 9, showing the construction and manner of operation of a second indicator mechanism of the removal apparatus;

DESCRIPTION OF THE PREFERRED EMBODIMENTS

Figure 1:
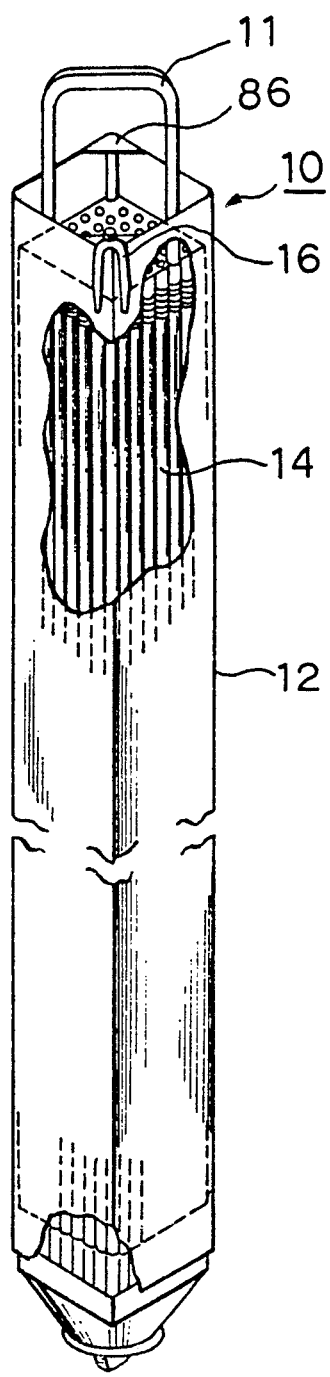
FIG. 1 is a perspective view of a nuclear fuel assembly with a channel box thereon which is partially broken away to show the fuel rods of the assembly.
Figure 2:
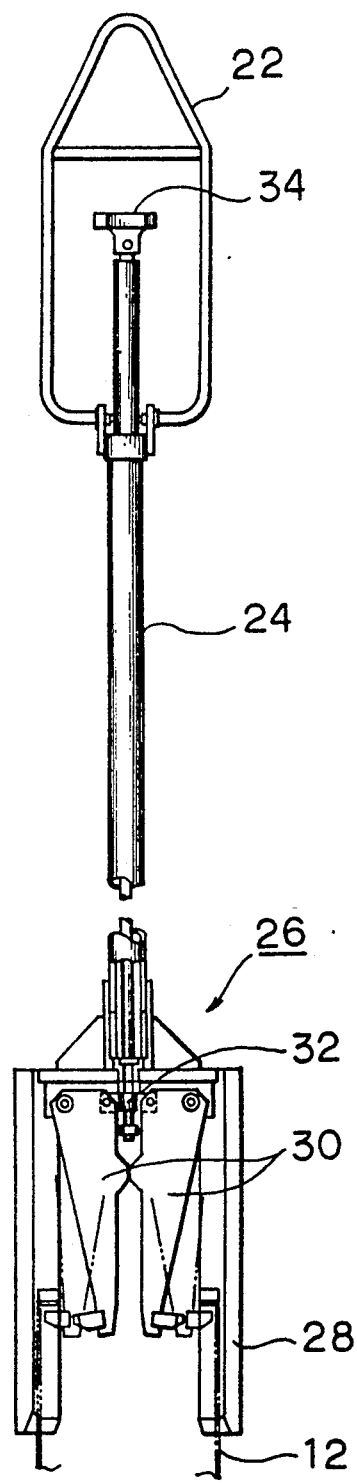
FIG. 2 is a schematic front elevation of the channel box removing apparatus of conventional type.
Figure 3:
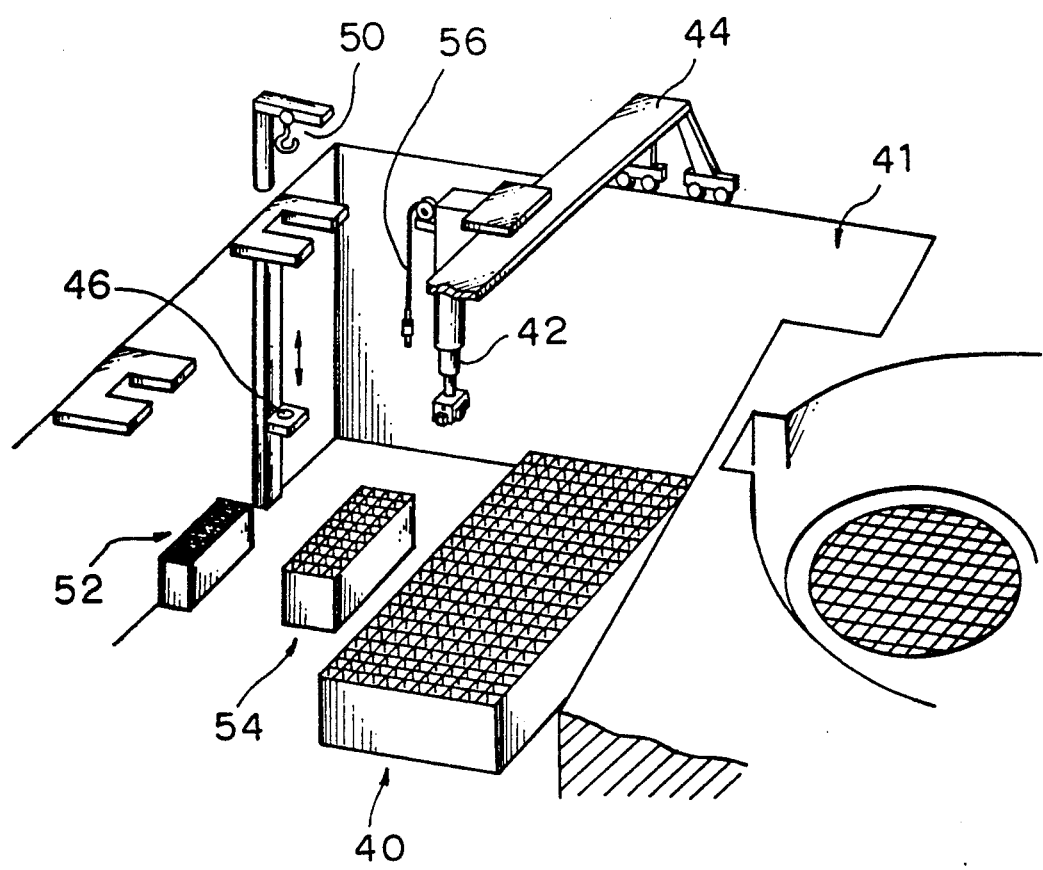
FIG. 3 is a schematic perspective view showing the general structure of a spent fuel storage pool during refuelling.
Figure 4:
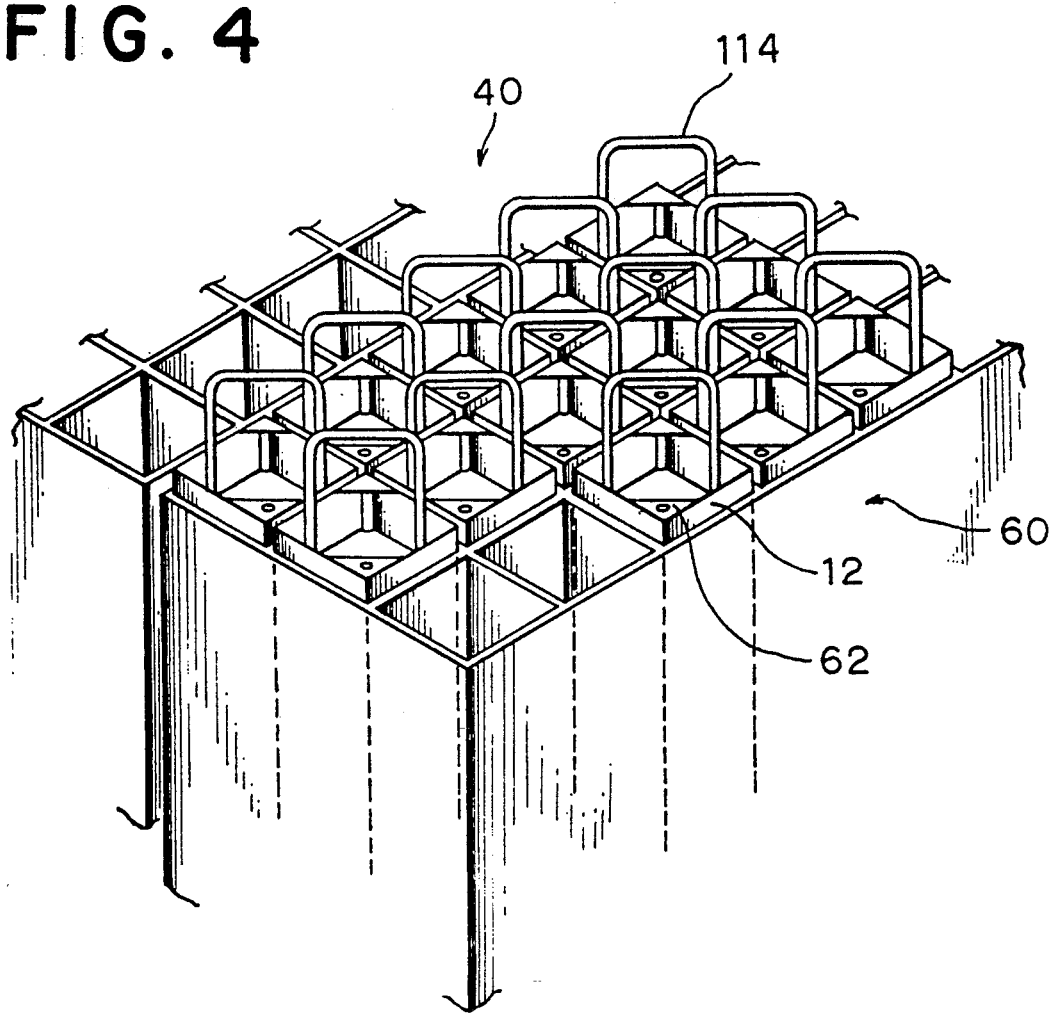
FIG. 4 is a schematic perspective view of the nuclear fuel assemblies compactly arranged in the fuel rack.
Figure 5:
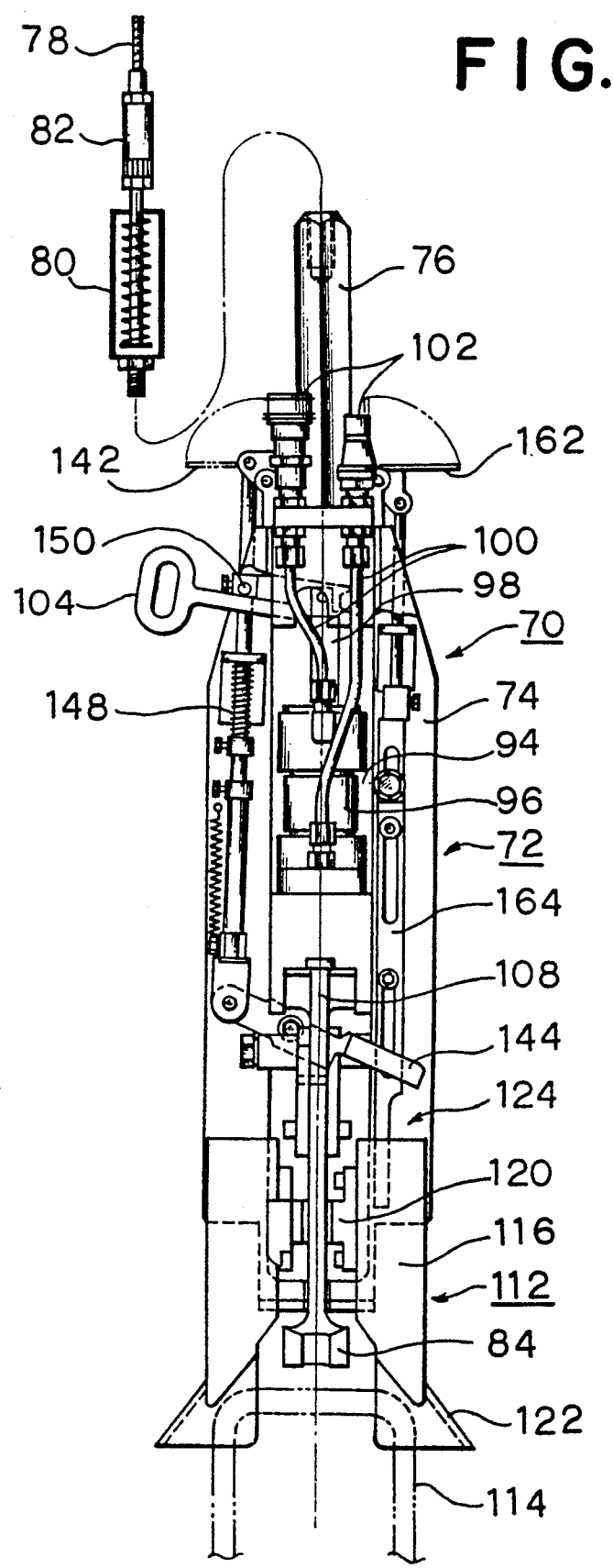
FIG. 5 is a partially sectioned, schematic front elevation of the channel box removing apparatus in accordance with the invention.

Referring to the drawings, and particularly to FIG. 5, there is illustrated a front elevational view of a channel box removing apparatus of the present invention generally designated by the numeral 70. As shown, the channel box removing apparatus 70 comprises a frame structure 72 including four elongated, upright, angular support members 74 defining four corners thereof; and a lifting rod 76 mounted to and extending upwardly from the top of the frame structure 72. The lifting rod 76 is normally connected to the lower end of a suspension wire 78 by means of a spring-loaded shock absorber 80 and a cable terminal fitting 82. The suspension wire 78 is connected to an auxiliary hoist, crane or the like (not shown).

Figure 6:
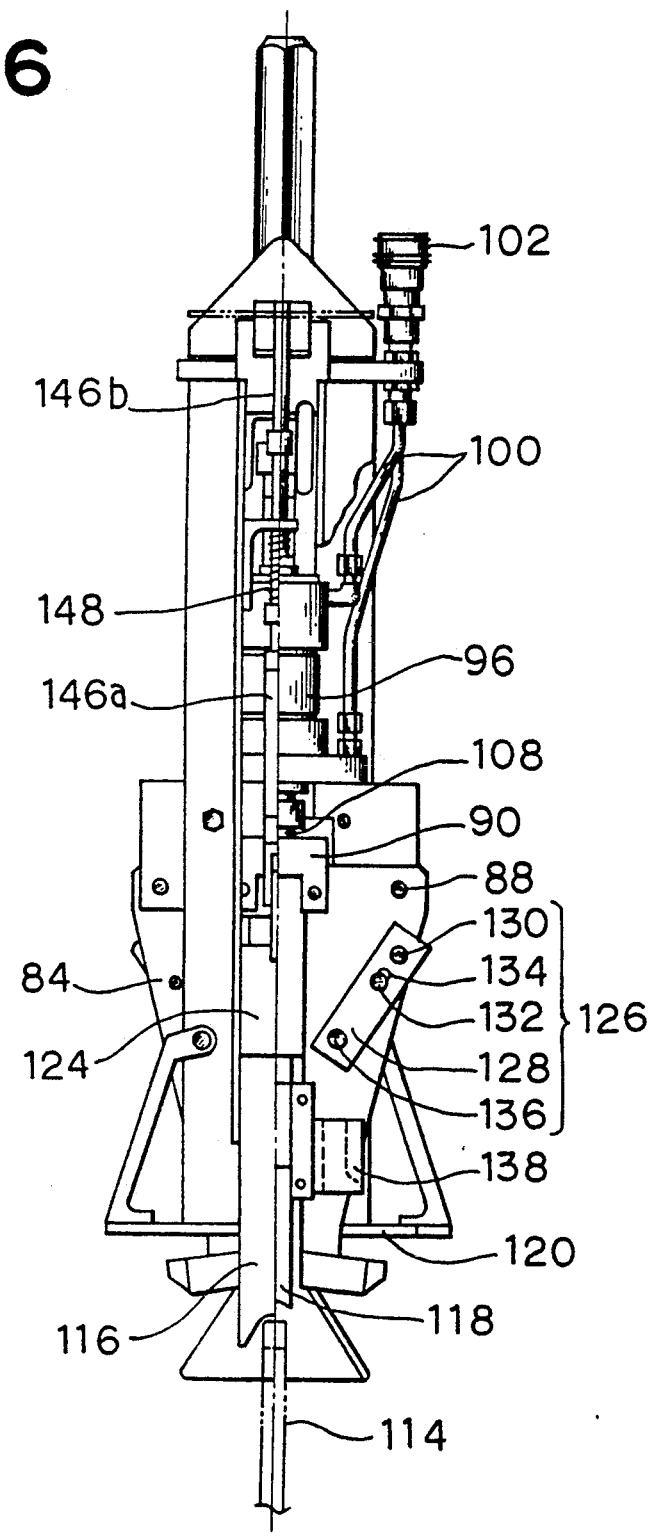
FIG. 6 is a side elevation, partially in section, of the channel box removing apparatus shown in FIG. 5.
Figure 7:
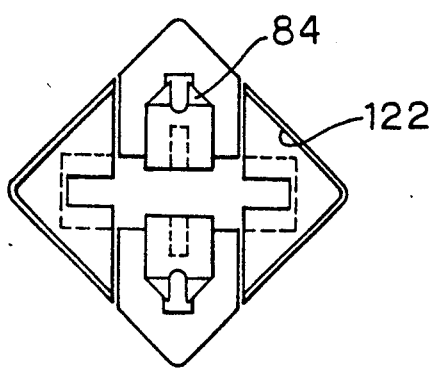
FIG. 7 is a bottom view of the channel box removing apparatus of FIG. 5.
Figures 8A, 8B:
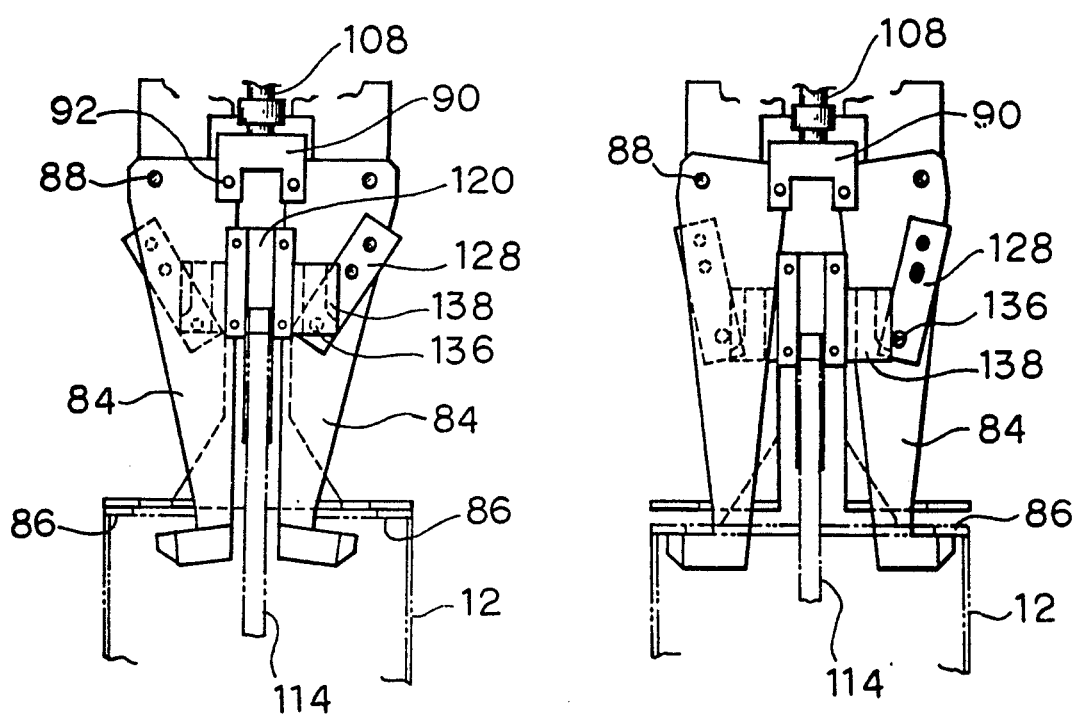
FIG. 8(A) is a schematic view showing the operation of a pair of releasable hooks of the present channel box removing apparatus with the unlatched hooks away from lifting engagement from the associated clips of the channel box.
FIG. 8(B) is a view similar to FIG. 8(A), but showing the releasable hooks in a latched position to engage the associated clips.

As seen in FIGS. 5, 6 and 8, the channel box removing apparatus 70 includes a pair of releasable hooks 84 adapted to engage the undersurfaces of clips 86 provided adjacent a pair of diagonally opposed top corners of the channel box 12. Each of the releasable hooks 84 has an upper end pivotally mounted by a pin 88 on the lower portion of the frame structure 72 and a lower end extending downwardly from the bottom of the frame structure. The removal apparatus also includes a bifurcated bracket 90 which is pivotally connected to the releasable hooks 84 by pins 92 in a manner to straddle the hook pair, as best seen in FIGS. 8A and 8B. Vertical movement of the bracket 90 results in the movement of the pair of releasable hooks 84 between an unlatched position (FIG. 8A) and a latched position (FIG. 8B).

The channel box removing apparatus 70 also includes a pneumatic control mechanism 94 for controlling the movement of the releasable hooks 84, which comprises a double-acting pneumatic cylinder 96 mounted substantially in the center of the removal apparatus, a piston rod 98 having its lower end operatively connected to the bracket 90, and resilient air hoses 100 leading from two chambers of the pneumatic cylinder 96. The resilient air hoses 100 are in turn connected at their respective upper ends to connector plugs 102. A hand lever 104 having a ring end is provided which permits forced disengagement of the releasable hooks 84 from the channel box. The hand lever 104 is rotatably mounted at the other end to the frame structure 72 by means of a pin 106 (FIG. 9) and also is pivotably connected adjacent the other end to the upper end of a piston rod 108 by a pin 110 (FIG. 9).

The channel box removing apparatus 70 includes a bail cap 112 which is adapted for placement on a bail 114 provided on an upper tie plate of the nuclear fuel assembly. The bail cap 112 comprises a pair of spaced support members 116 provided in opposed relationship to each other and having a vertically extending guide slot 118 defined therebetween to slidably receive the bail 114, a connector member 120 securely connecting the pair of support members 116 in their middle portions and adapted for abutting engagement with the top of the bail 114, and a pair of bail guides 122 extending downwardly and outwardly from the bottom ends of the respective support members 116 and having their open lower edges adapted to abut the upper ends of the channel box 12 adjacent a pair of diagonally opposed corners thereof which are different from the pair of corners having the clips 86 provided thereon. The bail cap 112 is provided on the removing apparatus for vertical movement along a guide groove 124 defined in the lower portion thereof.

Referring to FIGS. 6 and 8, there is provided a locking mechanism 126 for locking the releasable hooks 84 in the latched position, i.e., in engagement with the undersurfaces of the associated clips 86 of the channel box 12. The locking mechanism 126 includes a pair of swing plates 128 which can selectively double the range of pivotal movement of the releasable hooks 84 and which are pivotally mounted adjacent their upper ends to the frame structure 72 by pins 130. A pin 132 projecting from each releasable hook 84 is loosely received in a slit 134 formed in the swing plate 128 to permit a swinging movement of the lower end of the swing plate 128 beyond the pivotal range of the releasable hook 84. Each swing plate 128 has a stopper pin 136 provided at its lower end. The bail cap 112 has a pair of stopper members 138 integrally formed on the side surfaces thereof. Each stopper member 138 has a groove indicated by phantom lines which can be engaged by the associated stopper pin 136 when the associated releasable hook 84 is in its unlatched position as shown in FIG. 8(A). When the associated releasable hook 84 is in its latched position with the bail cap 112 slightly lowered relative to the removal apparatus, the stopper pin 136 abuts the stopper member 138.

Referring to FIG. 9, there is provided a first indicator mechanism 140 which comprises a red indicator plate 142 in the shape of a right-angled equilateral triangle, the indicator plate 142 being pivotally mounted adjacent its bottom end to the top of the frame structure 72 for swinging movement between an upright and a horizontal position, an actuator link 144 pivotally mounted at its middle portion to the frame structure, the actuator link 144 being engagable with the bail cap 112 in the guide groove 116 provided in the lower portion of the removal apparatus, and a control rod 146 having opposite ends pivotally connected to the rear face of the red indicator plate 142 and one end of the actuator link 144, respectively. The control rod 146 comprises a lower portion 146a, and an upper portion 146b adapted to be vertically moved relative to the lower portion 146a. The upper portion 146b is biased downwardly by a spring 148 and includes a pin 150 provided in the middle portion thereof which causes vertical movement of the upper portion 146b in response to the movement of the hand lever 104 because of its engagement with the pin 150. The lower portion 146a is biased upwardly by a spring 152, the upper end of the lower portion 146a being in engagement with a stopper 154 on the upper portion 146b normally, i.e., when the bail cap 112 is out of engagement with the actuator link 144. Accordingly, with the bail guides 122 of the removal apparatus 70 resting in place on the diagonally opposed corners of the channel box 12, further lowering of the removal apparatus relative to the bail cap 112 until the unlatched hooks 84 are inserted into the channel box 12 will bring the bail cap 112 into engagement with the lower end of the actuator link 144. This will rotate the actuator link 144 in a counter-clockwise direction as viewed in FIG. 9 and accordingly move the lower portion 146a downwardly against the action of the spring 152. In this condition, the piston rod 108 can be lowered by actuation of the pneumatic cylinder 96 to move the releasable hooks 84 to the latched position where they engage the undersurfaces of the associated clips 86 of the channel box 12. This will cause a downward movement of the upper portion 146b by the action of the spring 148, rotating the hand lever 104 in a counter-clockwise direction as viewed in FIG. 9 because of its engagement with the pin 150. As a result, the red indicator plate 142 is moved to its horizontal position indicating that the pair of releasable hooks 84 are in the latched position.

Referring to FIG. 10, there is provided a second indicator mechanism 160 comprising a yellow indicator plate 162 in the shape of a right-angled equilateral triangle also, the plate 162 being pivotally mounted adjacent its bottom end to the top of the removal apparatus 70 on the opposite side to the red indicator plate 142 so that the yellow indicator plate 162 can swing between its upright and horizontal positions. The second indicator mechanism 160 also includes an actuator link 164 having its upper end pivotally connected to the yellow indicator plate 162, the lower end of the control rod 164 slidably extending through the guide groove 124 in the lower portion of the removal apparatus and an aligned groove of the bail cap 112 into the vertically extending guide slot 118.

The yellow indicator plate 162 normally assumes the horizontal position under the action of the weight of the actuator link 164. However, in lowering the removal apparatus 70, when the lower edges of the bail guide 122 first comes into abutting engagement with the associated corners of the channel box 12, followed by the bail 114 of the channel box 12 being received in the bail cap 112, the bail cap 112 will move upwardly relative to the removal apparatus, causing the bail 114 to come into abutting engagement with the lower end of the control rod 164. As a result, the control rod 164 is moved upward to rotate the yellow indicator plate 162 in a counter-clockwise direction as viewed in FIG. 10 to the upright position.

When the releasable hooks 84 are moved to the latched position to engage the undersurfaces of the associated clips 86 of the channel box 12, lifting of the removal apparatus will move the channel box 12 upwardly relative to the fuel assembly proper 14 and, at the same time, cause lowering of the bail cap 112 relative to the removal apparatus. As a result, the bail 114 is disengaged from the actuator link 164, causing the yellow indicator plate 162 to swing to the horizontal position under the action of the weight of the actuator link 164. It should thus be noted that when the yellow indicator plate 162 is in the upright position, it provides a visual indication that the bail cap 112 is in the position to fully receive the bail 114. When the yellow indicator plate 162 is in the horizontal position, it indicates that the channel box 12 can be pulled up separately from the fuel assembly.

Figure 11B:
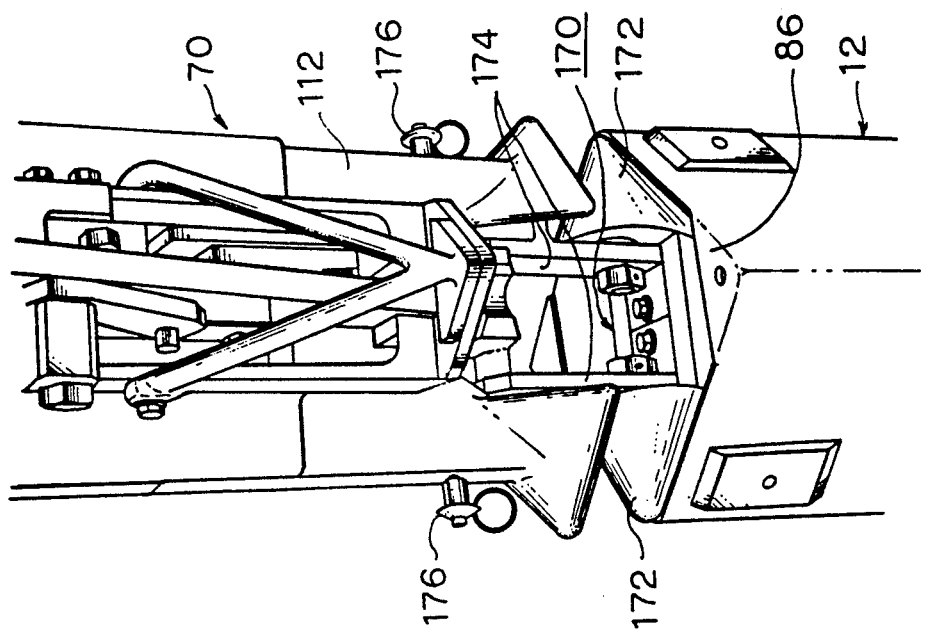
FIG. 11(B) is a fragmentary perspective view showing the manner in which the guide unit is employed to guide the removal apparatus into an operative position with the fuel assembly.
Figure 11A:
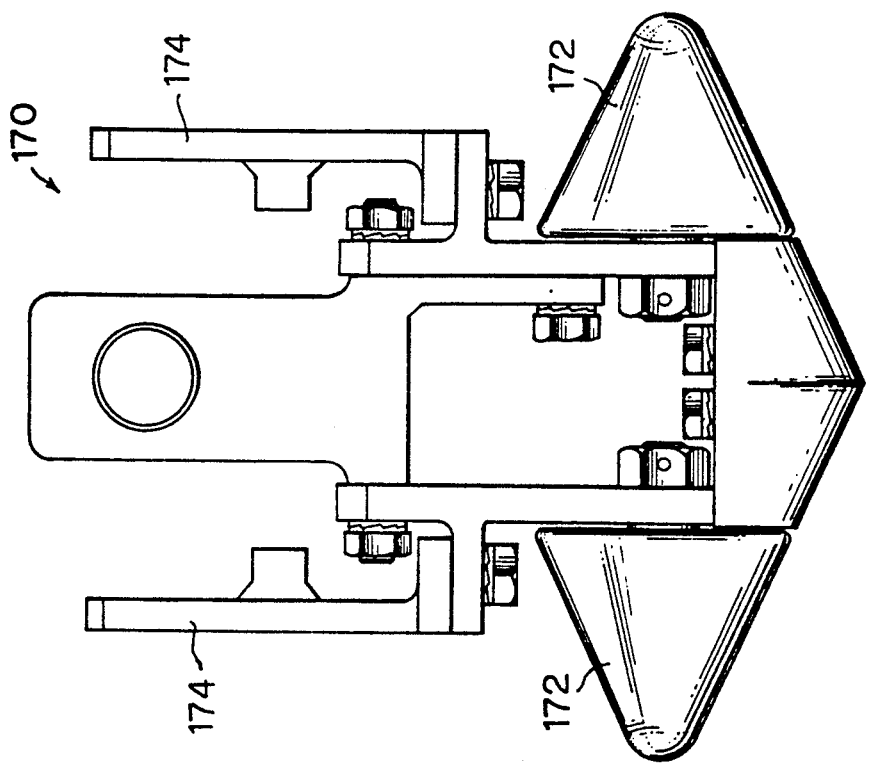
FIG. 11(A) is a front elevation of a guide unit to be removaly attached to the channel box removing apparatus.

Referring to FIGS. 11(A) and 11(B), there is shown a guide unit 170 removably mounted to the bail cap 112 to facilitate guidance of the removal apparatus into its operative position with the fuel assembly from which the channel box is to be removed. The guide unit 170 comprises a pair of conical guide rollers 172 rotatable about a common horizontal axis, and a pair of support members 174 having their lower ends rotatably supporting the guide rollers 172. The pair of support members 174 of the guide unit 170 are removably and rotatably mounted to the lower end of the bail cap 112 by connector pins or ball lock pins 176.

As best seen in FIG. 11(B), the pair of guide rollers 172 can slidably and rotatably engage a pair of diagonally opposed corners of the channel box 12 having no clips attached thereto. It will be appreciated by those skilled in the art that this guide unit can conveniently be used in hoisting and transfering channel boxes separated from their associated fuel assemblies.

Removal of the channel box from the associated fuel assembly using the removal apparatus of the present invention is accomplished during refuelling, as follows:

(1) About 200 spent fuel assemblies previously transferred from a reactor core (not shown) onto the fuel rack 40 within the spent fuel storage pool 41 are lifted by the main hoist 42 on the refuelling platform car 44 for transfer to the preparation machine 46.

(2) At the preparation machine 46, the fastener bolts 16 threaded into the associated clips 86 to secure the channel box to the fuel assembly proper are removed by a conventional bolt wrench (not shown) which is about four meters long.

(3) After removal of the fastener bolts, the nuclear fuel assembly is transferred by the main hoist 42 from the preparation machine 46 back to the fuel rack 40.

(4) The channel box removing apparatus 70 is suspended from the cable terminal end of the auxiliary hoist 56 and is lowered onto the nuclear fuel assembly placed in the fuel rack 40. Then the channel box 12 is pulled up from the nuclear fuel assembly to be separated therefrom by the auxiliary hoist 56 and is transferred to an unoccupied location in the fuel rack.

It will be appreciated that the above steps (1) to (4) of channel box removal are much simpler and less time consuming than the conventional steps (1) to (5) as described above. If a long bolt wrench, e.g., 10 meters long, such as one disclosed in, applicant's copending U.S. application, Ser. No. 07/501,107, entitled: "Bolt Wrench" is used, the step (1) of transferring the nuclear fuel assembly from the fuel rack to the preparation machine as well as the step (3) of transferring the nuclear fuel assembly with the fastener bolts removed from the preparation machine back to the fuel rack can be dispensed with.

Now, the manner in which the channel box is separated from the fuel assembly in step (4) will be described in more detail:

The removal apparatus of the invention is gradually lowered onto the fuel assembly 10 on the fuel rack 40. During lowering of the removal apparatus, the bail 114 of the upper tie plate of the unclear fuel assembly 10 serves to guide the bail guide 122 of the removal apparatus 70 into a position where the bail cap 112 completely covers the bail 114 while simultaneously the lower edges of the bail guides 122 rest on the top of the channel box 12. Further lowering of the removal apparatus 70 will move the bail cap 112 upwardly relative to the apparatus and cause the pair of releasable hooks 84 to be inserted into the channel box 12. This will cause the bail 114 to move the control rod 164 upwardly, resulting in a swinging movement of the yellow indicator plate 162 to the upright position. In the upright position, the red indicator plate 142 is not visible from just above.

Now, the pneumatic cylinder 96 may be activated to move the piston rod 108 downwardly so as to move the pair of releasable hooks 84 into the latched position where the hooks are in lifting engagement with the associated clips 86 of the channel box 12. When the piston rod 108 moves downwardly, the upper portion 146b of the actuator link 146 also is moved downwardly by the action of the spring 148, because the upper portion 146b is operatively connected with the piston rod 108 via the pin 110, the hand lever 104 and the pin 150. Accordingly, the red indicator plate 142 swings to the horizontal position so that the red indicator plate is visible from just above.

Next, the removal apparatus 70 is lifted by the auxiliary hoist 56 relative to the bail cap 112 which rests on the channel box 12. This will cause the stopper pins 136 on the pair of releasable hooks 84 to engage the associated stopper members 138 as shown in FIG. 8(B) so that the releasable hooks 84 are effectively locked to prevent their disengagement from the associated clips 86 on the channel box 12 even in the event of a malfunction of the pneumatic cylinder 96, for example.

As the removal apparatus 70 is further lifted, the channel box 12 is moved upwardly separately from the nuclear fuel assembly proper 14. This will disengage the lower end of the control rod 164 from engagement with the bail 114 and accordingly cause the yellow indicator plate 162 to swing to the horizontal position under the action of the weight of the control rod 164. In the horizontal position, the yellow indicator plate 162 is visible from just above. It should be noted that the second indicator mechanism 160 provides a visual indication that the channel box 12 has been removed from the nuclear fuel assembly 14.

The removal apparatus 70 carrying the channel box 12 is then moved to a position above an intended location in the spent fuel storage pool 41, normally the fuel rack 40, where it is lowered until the channel box reaches the bottom of the fuel rack. When the removal apparatus 70 is further lowered relative to the channel box 12, the stopper pins 136 disengage from the associated stopper members 138. In this condition, the pneumatic cylinder 96 is activated to move the piston rod 108 upwardly so as to move the pair of releasable hooks 84 into the unlatched position as shown in FIG. 8(A). As shown, the pair of releasable hooks 84 are out of engagement with the associated clips 86, so that the removal apparatus 70 can be lifted separately from the channel box 12.

It will be appreciated that the hand lever 104 provides an emergency disconnect mechanism for moving the pair of releasable hooks 84 into the unlatched position in the event of a malfunction of the air supply system including a faulty air source or air hoses. That is, if difficulties are experienced in releasing or disengaging the pair of hooks 84 from the clips 86 of the channel box 12, the hand lever 104 may be moved upwardly by hooking the ring portion by suitable means and lifting it to move the piston rod 108 upwardly to thereby unlatch the pair of releasable hooks 84.

It will be appreciated that in accordance with the teachings of the present invention there has been provided an improved apparatus for removing a channel box from a nuclear fuel assembly in an efficient and reliable manner. To recapitulate the important features of the invention:

(1) The invention can simplify the channel box removal operation by eliminating certain transfer steps which were necessary if the removal apparatus of the conventional type is used. This provides additional advantages of a reduced operation time, a decreased operator's exposure to radioactivities, and a reduced possibility of damage to fuel assemblies during transfer.

(2) The provision of the lock mechanism prevents accidental release of the pair of releasable hooks 84 with the consequential fall of the channel box 12, as the releasable hooks cannot be disengaged from the associated clips 86 so long as the stopper pins 136 are in engagement with the stopper members 138 as shown in FIG. 8(B).

(3) The use of the first and second indicator mechanisms 140 and 160 provides visual indications that the removal apparatus 70 is in lifting engagement, or out of engagement with the channel box 12, respectively. When the red indicator plate 142 is in the horizontal position, it indicates that the removal apparatus 70 can be lifted to separate the channel box from the fuel assembly proper 14 as the pair of releasable hooks 84 are in positive engagement with the clips 86 of the channel box. On the other hand, when the yellow indicator plate 162 is in the horizontal position, it indicates that the pair of releasable hooks 84 are out of engagement with the associated clips 86 so that the removal apparatus can be lifted separately from the channel box. This enables various underwater operations within the spent fuel storge pool to be performed efficiently and reliably by remote control.

Although the present invention has been described in terms of what are at present believed to be its preferred embodiments, it will be apparent to those skilled in the art that various changes may be made without departing from the scope of the invention. It is therefore intended that the appended claims cover such changes.

What is claimed:

1. An apparatus for removing a channel box from a nuclear fuel assembly having a bail provided on the top thereof, the channel box being generally square in cross section having the fuel assembly mounted therein in a telescopic relationship to each other, the channel box having a pair of clips provided adjacent a pair of diagonally opposed top corners thereof, the channel box removing apparatus comprising:

a frame structure adapted for suspension from a lifting and transporting device;

a pair of releasable hooks pivotally mounted to the lower portion of the frame structure and movable between a first position in which the releasable hooks are in lifting engagement with the clips of the channel box and a second position in which the releasable hooks are released from the lifting engagement with the clips;

an operating mechanism for moving the pair of releasable hooks between the first and second positions; and bail cap means mounted to the lower portion of the frame structure for vertical movement relative to the frame structure, the bail cap means being adapted to cooperate with the bail of the fuel assembly to guide the channel box removing apparatus into an operative position with the fuel assembly during lowering of the apparatus toward the fuel assembly with the pair of releasable hooks in the second position, the operating mechanism being activated to move the pair of releasable hooks into the first position after arrival of the channel box removing apparatus at the operative position.

2. A channel box removing apparatus as defined in claim 1, wherein the bail cap means comprises a pair of spaced support members provided in opposed relationship to each other and having a vertically extending guide slot defined therebetween to slidably receive the bail, a connector means securely connecting the pair of support members in their middle portions and adapted for abutting engagement with the top of the bail, and a pair of bail guides extending downwardly and outwardly from the bottom ends of the respective support members and having their open lower edges adapted to abut the upper ends of the channel box adjacent a pair of diagonally opposed corners thereof different from the pair of diagonally opposed corners having the clips provided thereon.

3. A channel box removing apparatus as defined in claim 1, wherein each of the releasable hooks has an upper end pivotally mounted to the lower portion of the frame structure and a lower end extending downwardly from the bottom of the frame structure, and bracket means pitovally connected to the releasable hooks in a manner to straddle the hook pair, and wherein the operating mechanism comprises a cylinder mounted to the frame structure, a piston rod for the cylinder and having its lower end operatively connected to the bracket means, and conduit means for supplying operating fluid to the cylinder, whereby activation of the operating mechanism causes vertical movement of the piston rod and accordingly the bracket means to move the releasable hooks between the first and second positions.

4. A channel box removing apparatus as defined in claim 2, further comprising a hand lever having one end rotatably mounted to the frame structure and the other end adapted to be hooked for forced disengagemnt of the pair of releasable hooks from the channel box, the hand lever being pivotally connected adjacent the other end thereof to the top of the piston rod so that pivotal movement of the hand lever in a direction to cause upward movement of the piston rod moves the pair of releasable hooks to the second position.

5. A channel box removing apparatus as defined in claim 1, further comprising a locking mechanism for preventing accidental disengagement of the pair of releasable hooks from the associated clips of the channel box when the channel box is being lifted by the removal apparatus.

6. A channel box removing apparatus as defined in claim 5, wherein the locking mechanism comprises a pair of swing plates capable of selectively doubling the range of pivotal movement of the releasable hooks, each swing plate being pivotally mounted adjacent its upper end to the frame structure and having a slit formed therein, a first pin projecting from each releasable hook and being loosely received in the slit of the swing plate to permit a swinging movement of the lower end of the swing plate beyond the pivotal range of releasable hook, a second pin provided adjacent the lower end of each swing plate, and a stopper member integrally formed on each side surface of the bail cap means, each stopper member having a groove adapted to be engaged by the associated second pin when the associated releasable hook is in the first position, the second pin being in abutting engagement with the stopper member when the associated releasable hook is in the second position with the bail cap means slightly lowered relative to the removal apparatus.

7. A channel box removing apparatus as defined in claim 1, further comprising a first indicator mechanism for providing a visual indication that the pair of releasable hooks of the removal apparatus are in the first position.

8. A channel box removing apparatus as defined in claim 7, wherein the first indicator mechanism comprises a first indicator plate pivotally mounted to the frame structure for swinging movement between an upright position and a horizontal position, a first actuator link pivotally mounted to the frame structure adapted to be engaged by the bail cap means, and a control rod having upper and lower ends pivotally connected to the rear face of the first indicator plate and to one end of the first actuator link, respectively, the control rod comprising a lower portion and an upper portion adapted to be moved vertically relative to each other, the upper portion of the control rod being biased downwardly to move the first indicator plate to the horizontal position and adapted to move upwardly to move the first indicator plate to the upright position in response to movement of the pair of releasable hooks from the first to the second position, the lower portion of the control rod being biased upwardly and being in engagement with the lower end of the upper portion of the control rod when the first actuator link is out of engagement with the bail cap means, whereby lowering of the removal apparatus toward the fuel assembly after the bottom of the bail cap means comes into engagement with the top of the channel box causes the bail cap means to move upwardly relative to the frame structure to bring the bail cap means into engagement with the lower end of the first actuator link to thereby rotate the first actuator link and to move the lower portion of the control rod downwardly, so that when the operating mechanism is activated in this condition, the upper portion of the control rod moves downwardly to move the first indicator plate to the horizontal position.

9. A channel box removing apparatua as defined in claim 1, wherein the operating mechanism includes a cylinder mounted to the frame structure, a piston rod for the cylinder and having its lower end operatively connected to the pair of releasable hooks, and a hand lever having one end rotatably mounted to the frame structure and the other end adapted to be hooked for forced disengagemnt of the pair of releasable hooks from the channel box, the hand lever being pivotally connected adjacent the other end thereof to the top of the piston rod so that pivotal movement of the hand lever in a direction to cause upward movement of the piston rod moves the pair of releasable hooks to the second position, and wherein the upper portion of the control rod has a third pin provided thereon which is operatively associated with the hand lever in such a manner that upward movement of the piston rod causes a corresponding movement of the control rod to move the first indicator plate to the upright position.

10. A channel box removing apparatus as defined in claim 7, further comprising a second indicator mechanism for providing a visual indication that the pair of releasable hooks are in the first position and also that the channel box alone can be lifted separately from the fuel assembly.

11. A channel box removing apparatus as defined in claim 10, wherein the second indicator mechanism comprises a second indicator plate pivotally mounted to the frame structure for swinging movement between an upright position and a horizontal position, a second control rod having an upper end pivotally connected to the rear face of the second indicator plate and a lower end extending downwardly through the frame structure into the lower portion thereof and adapted to be engaged by the bail of the fuel assembly, the second indicator plate being normally in the horizontal position due to the weight of the second control rod but adapted to be moved to the upright position by the upward movement of the second control rod caused by upward movement of the bail of the fuel assembly in abutting engagement with the lower end of the second control rod, whereby lifting of the removal apparatus with the pair of releasable hooks in the first position causes lowering of the bail cap means relative to the frame structure, disengaging the bail of the fuel assembly from the lower end of the second control rod to allow the second control rod to move downwardly thereby moving the second indicator plate to the horizontal position.

12. A channel box removing apparatus as defined in claim 1, further comprising a guide means removably mounted to the bail cap means to facilitate guidance of the removing apparatus into the operative position with the fuel assembly.

13. A channel box removing apparatus as defined in claim 12, wherein the guide means comprises a pair of conical guide rollers rotatable about a common horizontal axis and adapted to slidably and rotatably engage the pair of diagonally opposed corners of the channel box having no clips provided thereon, and support means removably mounted to the lower end of the bail cap means and supporting the pair of conical guide rollers.

* * * * *